(12) United States Patent
Burgler

(10) Patent No.: US 7,610,831 B2
(45) Date of Patent: Nov. 3, 2009

(54) PRESS-FITTED HUB AND CAMSHAFT

(76) Inventor: Robert Burgler, Spidach 238, Ruggell (LI) LI-9491

( * ) Notice: Subject to any disclaimer, the term of this patent is extended or adjusted under 35 U.S.C. 154(b) by 472 days.

(21) Appl. No.: 10/517,173

(22) PCT Filed: Jul. 24, 2003

(86) PCT No.: PCT/EP03/08130

§ 371 (c)(1),
(2), (4) Date: Dec. 7, 2004

(87) PCT Pub. No.: WO2004/013507

PCT Pub. Date: Feb. 12, 2004

(65) Prior Publication Data

US 2005/0172755 A1 Aug. 11, 2005

(30) Foreign Application Priority Data

Jul. 31, 2002 (EP) .................. 02017216

(51) Int. Cl.
*F16H 53/00* (2006.01)
(52) U.S. Cl. ........................................ 74/567
(58) Field of Classification Search .............. 74/567, 74/595, 596, 597, 598, 600
See application file for complete search history.

(56) References Cited

U.S. PATENT DOCUMENTS

| | | | | |
|---|---|---|---|---|
| 4,798,178 A | * | 1/1989 | Greulich et al. | 123/90.6 |
| 4,886,392 A | | 12/1989 | Iio | |
| 5,081,880 A | * | 1/1992 | Swars | 74/567 |
| 5,158,390 A | * | 10/1992 | Ito et al. | 403/282 |
| 5,299,881 A | * | 4/1994 | Mettler-Friedli | 403/274 |
| 5,307,708 A | * | 5/1994 | Matt | 74/567 |
| 6,502,538 B2 | * | 1/2003 | Leuthold | 123/90.6 |
| 6,722,864 B2 | * | 4/2004 | Suzuki et al. | 417/470 |
| 6,804,884 B1 | * | 10/2004 | Vogel | 29/888.1 |
| 7,020,962 B2 | * | 4/2006 | Merz | 29/888.1 |
| 7,225,909 B1 | * | 6/2007 | Kalinsky et al. | 192/85 CA |

* cited by examiner

*Primary Examiner*—Vicky A Johnson
(74) *Attorney, Agent, or Firm*—David A. Guerra

(57) ABSTRACT

The invention relates to a hub (1) with a hub opening (2) in the front face (8), for press-fitting to a base body, whereby the hub (1) comprises a insertion region (A2), tapering in the pressing direction, characterized in that a cylindrical section is arranged between the front face and insertion region (A2), viewed in the pressing direction. Furthermore, a hub (1) with a tapering insertion region (A2) is disclosed, whereby said insertion region (A2) has a length of 40% to 96% of the total length (L) of the hub (1). The invention further relates to a camshaft with at least one cam (9), associated with said hub (1).

16 Claims, 5 Drawing Sheets

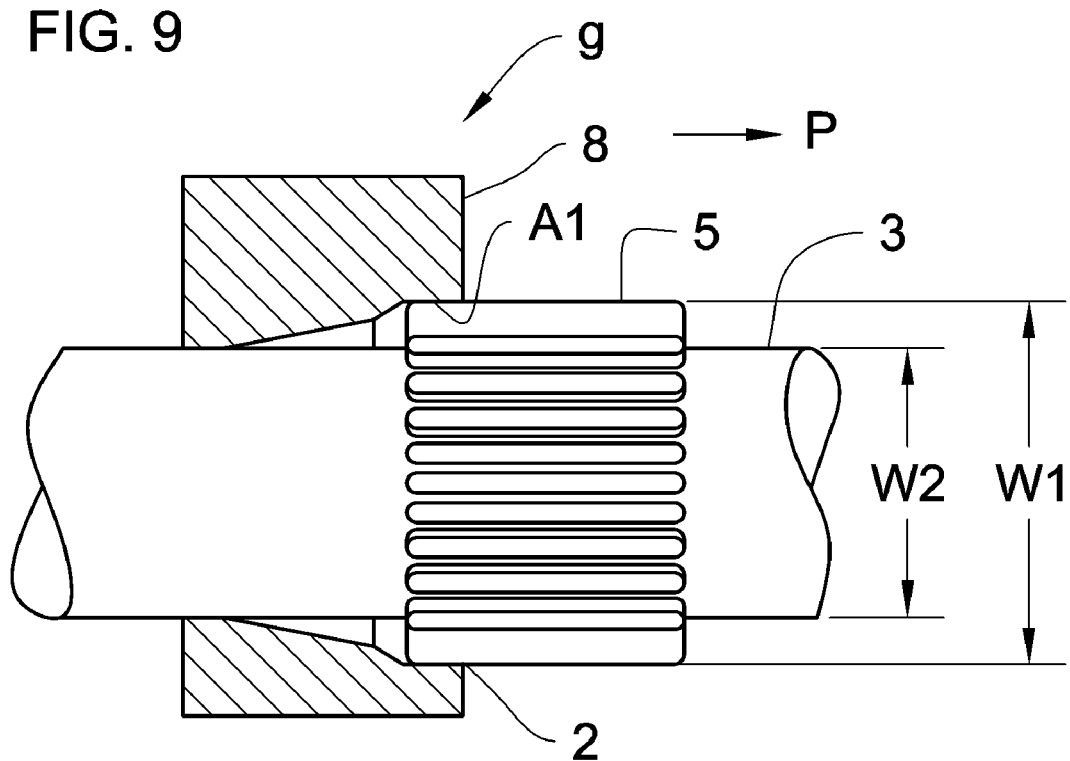

PRESS-FITTED HUB AND CAMSHAFT

CROSS-REFERENCE TO RELATED APPLICATIONS

This application is an U.S. national phase application under 35 U.S.C. §371 based upon co-pending International Application No. PCT/EP2003/008130 filed on Jul. 24, 2003. Additionally, this U.S. national phase application claims the benefit of priority of co-pending International Application No. PCT/EP2003/008130 filed on Jul. 24, 2003 and European Application No. 02017216.9 filed on Jul. 31, 2002. The entire disclosures of the prior applications are incorporated herein by reference. The international application was published on Feb. 12, 2004 under Publication No. WO 2004/013507 A1.

BACKGROUND OF THE INVENTION

1. Field of the Invention

The present invention relates to a hub and a cam with a hub for pressing onto a base body and a camshaft with at least one pressed-on hub, in particular, a cam.

2. Description of Related Art

It is known to make camshafts by pressing cams onto a shaft. On the respectively provided positions for the cam, the shaft is machined, such that a material aggregate exists, whose diameter exceeds that of the shaft. Upon pressing on, this material is deformed by the cam, so that the cam is fixed by a lateral pressing onto the shaft.

Cams for such a manufacturing method of camshafts are described in documents EP-A2 1058033 and WO-A1 01/94802.

The hub opening of a hub or a cam according to document EP-A2 1058033 is designated by two conically formed sections of the hub. These two hub sections connect successively to the front face of the cam, forward in the press-on direction. The two conical sections each have a different incline. With this profile structure, the disadvantage exists in that with pressing on of the cam onto the shaft, already at the beginning of the cam opening, a force effect acts on the cam, and so tensioning in the cam material can occur. This tensioning leads to microscopic tears in the structure and can cause a weakening or collapse of the attachment operation, and likewise, can cause functional destruction of the camshaft based on the deformation.

WO-A1 01/94802 shows a cam with an inlet area, which takes up approximately half of the cam or hub width. The profile of this inlet area is described as conical and goes continuously over into a hub region, which takes up the remaining width of the hub and is either conical or cylindrical. With this structure of the hub, a shifting of the connection tensioning in the center of the hub width should be possible. However, it should be noted that already after the beginning of the inlet region, a deformation of the material aggregate on the shaft takes place. Therefore, in this region, damage of the material connection with the result of microscopic tears in the outer region of the cam hub with the previously described effects is to be expected.

BRIEF SUMMARY OF THE INVENTION

The object of the present invention is to avoid the disadvantages of the known hubs and to make an alternative hub for pressing onto a base body.

The object is solved by a hub for pressing onto a base body, whereby the hub has a hub opening, which is defined by hub front faces, and whereby the hub has an insertion area A2 tapering in the press-on direction P, and the hub opening is characterized by a cylindrical section A1, which is arranged between the front face and insertion area A2 as viewed in the press-on direction.

With the term "hub" in the sense of the present invention, a section with a through-going opening within a component is to be understood, for example, those required with cams, wheels, cog wheels, eccentric rings, sensor rings, curved disks, or the like and for the mounting of cams, cogwheels, eccentric rings, sensor rings, curved disks onto a base body. Although the description relates substantially to hubs in cams, the invention is not limited thereto. Cams can be formed as a separate element, for example, tube-shaped. As a base body, also shafts, tubes, or also bearings (for example, ball bearings or bushings) can be used. Such cams are generally attached to or in the component, by which the hub is supported. Cams can be formed also integrally as an opening in a component.

A cylindrical embodiment of the section A1 of the hub avoids a direct effect of force between a component or a base body on which the hub is to be placed and the hub in the region of the front face, since the deformation of the material aggregates on the shaft begins upon pressing-on of the hub on the base body first in the tapered insertion region. Any connection strains occur, therefore, first in the insertion section A2; they act on the fixed seat of the hub on the base body. The base body can be a shaft, which can comprise solid material as well as a hollowed-out tube, or the like.

By avoiding the connection strains in the cylindrical section A1, the formation of weak points, such as microscopic tears or deformations or material distortions in the body, which supports the hub, for example, the running surfaces of a tire or a cam, are avoided. Damage to the function of the cam, as well to the material stability of the cam, is prevented.

Generally, the sequence of sections or areas of the hub are to be understood, in that, respectively, a lesser number lie forward in the press-on direction. The press-on direction is that in which, for example, the cam is guided over the base body. The cam front face is the surface of the cam, whose normal is oriented parallel to the press-on direction.

Advantageously, the hub of the present invention has a cylindrical section A1 of the hub opening, whose diameter is at least the same size as the largest diameter of the base body. Such a diameter D1 permits a simple placing of the hub on the base body and makes possible upon pressing on, the avoidance of existing connection strains in the region of the front face. A force effect between the base body and the hub in the cylindrical section A1 is not formed.

Likewise advantageously, a hub is formed, which has a hub opening with a second cylindrical section A3. This second cylindrical section A3 is arranged on the opposite side of the insertion area A2, with reference to the first cylindrical section A1. This section A3 also avoids the formation of weak points upon pressing-on of the hub, in particular, on the second front side of the hub, since the diameter of the base body already is reduced in the insertion area or insertion section A2 to the mass of the unmachined base body, in particular, the shaft. No substantial force transmission between the shaft and the hub takes place in section A3.

Essentially, the diameter D1 of the first cylindrical section A1 is greater than the diameter D2 of the cylindrical section A3.

One embodiment of the hub of the present invention is distinguished by an insertion section A2, which has a curved profile. This profile corresponds to circular segments arranged on one another, whereby these circulate segments have different radii. The length as well as the radius of the individual circular segments are directed toward the desired profiled structure. Of course, the profile also can be formed by sections of other curved shapes. The radii of the circular segments, which are adjacent to the first cylindrical section A1, are small.

The curve progression to the third section A3 is based on circular segments with a respectively increasing and greater radius. The continuous curvature of the curved profile permits an avoidance of a maximum connection strain and a force-fit connection extending over a larger area.

The curved segments cross over preferably continuously on another; that is, they connect tangentially to one another, respectively. The curved segments, however, also can discontinuously cross over one another; that is, on the respective transition points, a transition edge is provided. In addition, the first curved segment can continuously or discontinuously connect to the section A1.

The same is true for the last curved section, which can run continuously or discontinuously into the section A3. With a particularly simple embodiment, the curve between the sections A1 and A3 are formed by a radius, which, for example, connects discontinuously with the formation of the transition edge E1 to the section A1, and for example, continuously, that is, without formation of a transition edge in the section A3.

In a preferred embodiment, the insertion area (section) A2 of the hub is divided into two subsections, which are formed along the longitudinal axis of the hub in the form of a truncated cone. Therefore, both truncated cone-shaped subsections have different conical angles. The conical angle K1 of the subsection A2' adjacent to section A1 is greater than the conical angle K2 of the subsection A2" adjacent to section A3. The different conical angle permits, on the one hand, an improved centering of the hub upon pressing onto the base body and, on the other hand, a sufficient force-locking ability between the hub and the base body. In particular, in view of the frictional connection ability, it is important that this is provided over a sufficient longitudinal area of the hub, in order to permit a permanent connection also under operating conditions. Preferably, in addition, the cone with the conical angle K1 is opened in the same direction as the cone with the conical angle K2. Thus, a substantially continuous transition from a larger diameter to a smaller diameter can be assured. At the same time, the frictional connection between the hub and the base body is created over a wider region.

As "conical angle", the angle which is determined viewed from the fictional vertex of the truncated cone to the widening of the fictional cone is intended. The half value of a conical angle, therefore, provides the increase or incline of the conical surface with reference to the height of the truncated cone. The spatial orientation of the truncated cone to the hub is such that the truncated cone vertex coincides with the longitudinal axis of the hub.

In a preferred embodiment, the insertion area A2 of the hub 1 is formed by an individual truncated cone (cone), which tapers originating from the diameter D1 to the diameter D2.

In this manner, the edges E1 and E2 are formed on the transition points.

In a further preferred embodiment, the cam has a diameter D1 in the first section A1, which is at least the same size at a diameter W1 of the base body. The diameter W1 corresponds with the diameter of the material aggregate existing on the base body from a machining of the base body. These material aggregates are in the form of coils or bars. The material aggregates can extend either in the circumferential direction of the base body or parallel to the longitudinal axis of the hub. Based on the selection of the diameter D2 as at least the same size as the diameter W1, the hub can slide upon pressing-on first over the material aggregate, without material deformation. The hub is guided opposite to the hub and makes possible an improved centering of the hub on the base body. At the same time, as previously described, also a shifting of possible connection strains takes place in the central region (insertion section A2) of the hub and a related avoidance of weak points on exposed points of the cam. As exposed points, the front face or the region of the cam lying directly thereunder is to be understood.

Likewise, it is advantageous to form a hub, in which the diameter D2 is at least the same size or bigger than the diameter W2 of the base body. The diameter W2 corresponds with the diameter of the unmachined base body. The suitable selection of the diameter D2 makes possible, likewise, a guiding of the hub onto the base body during pressing-on.

At the same time, the formation of substantial connection strains in this second cylindrical section A is avoided, and therewith, likewise, the formation of weak points with possibly negative effects on the longevity of the hub-base body-connection. The diameter D2 relative to the diameter W2 is preferably selected, such that a clearance fit between the hub and base body is achieved.

In one embodiment, the hub of the present invention has a first section A2, which includes 2% to 30% of the entire length L of the hub. With such a length, it is assured that, on the one hand, a sufficient guiding of the hub is achieved, and on the other hand, possible connection strains are removed far enough from the front face and exposed points of the hub, in order to avoid the initially disclosed disadvantageous. Preferably, the section A2 has a length of 5% to 15% of the entire length of the hub.

It is likewise advantageous if the hub has a third section A3 with a length of 2% to 30% of the entire length L of the hub. Such a length ensures that no substantial connection strains exist in the region of the section A3, which could lead to weak points on the exposed points.

Also, a sufficiently good centering of the hub on the base body is made possible. Preferably, in addition, a length of the section A3 is from 5% to 15% of the entire length L of the hub.

In a further embodiment, the second insertion section A2 of the hub includes a length of 40% to 96% of the entire length L of the hub. This length of the insertion area A2 forms the region of the hub, which accommodates the frictional connection of the hub and shaft. This is important, in order to ensure an adequate functioning of the manufactured camshaft also under conditions of long-term use. Preferably, the insertion section has a length between 70% and 90% of the entire length L of the hub.

A further aspect of the hub of the present invention is the longitudinal ratio of the two subsections of the insertion section A2. The ratio of the subsection A2' to the subsection A2" lies between 0.1 and 10. By means of a suitable selection, the development of the frictional connection between the hub and the base body is controlled advantageously. Preferably, a longitudinal ratio between a first subsection and section subsection is from 0.1 to 5.

Furthermore, it is advantageous if the hub has a first conical angle K1 of 10° to 40°. This conical angle region permits driving the material deformation up to the point that a frictional connection between the hub and base body can be achieved directly.

A hub according to the present invention advantageously has a second conical angle K2 between 1° and 15°. This conical angle range leads to an expanded contact area between the hub and the shaft, which creates an approximately uniform frictional connection between the hub and base body. Based on such a structure, a possible maximum of connection strains is substantially reduced or avoided, and therewith, non-uniform and damaging loads are reduced.

In a further embodiment, a hub of the present invention has at least one recess, which extends at least over the length of the section A2 and A3 of the hub. Under the term "recess", a material demarcation, which defines a small part of the circumference of the hub and which extends radially outward at a maximum to the diameter D2 originating from the longitudinal axis of the hub, is to be understood. Such a recess, for example, is viewed as a narrow channel parallel to the longitudinal axis of the hub, which continues in a small circumferential region of the hub from the first section A2 through the sections A2 and A3. Such a recess ensures that additionally, from a frictional connection, a form fit between the hub and the base body is achieved, and thereby, a rotation of the cam in the circumferential direction is avoided.

The invention, in addition, includes a system having a base body, in particular, a shaft, and a cam, whereby the hub penetrates the cam or its front faces. The hub has a tapered insertion area A2. The hub and shaft are formed, such that upon pressing-on of the cam, the distance of the point for a first contact between the largest outer diameter of the shaft and the insertion area A2 amounts to at least 2% to 40% of the entire length L of the hub.

Distance values of at least 3% to 20% are preferred, and further preferred is at least 5% to 15% of the entire length L of the hub.

In addition, the present invention relates to a camshaft, on which at least one of the previously described inventive hubs, in particular, a cam, is pressed.

As the exemplary embodiment for a hub, in the following description of the invention, a cam for constructed camshafts is described. The invention, however, is not limited only to cams for constructed camshafts. Hubs, for example, can be formed as cogwheels, eccentric rings, sensor rings, curved disks, or the like.

BRIEF DESCRIPTION OF THE DRAWINGS

The schematic representations of the hub of the present invention show:

FIG. 3: cam cross section and shaft with material aggregate before pressing on.
FIG. 4: cam cross section and material aggregate of the shaft after pressing on.
FIG. 9: cam cross section and shaft with longitudinally parallel material aggregate before pressing on.

The figures show embodiments of hubs and cams with the features of the invention in a schematic representation; they do not represent exact proportions or dimensions and serve purely for clarification of the principle structure of a hub according to the present invention.

DETAILED DESCRIPTION OF THE INVENTION

Figure 1:
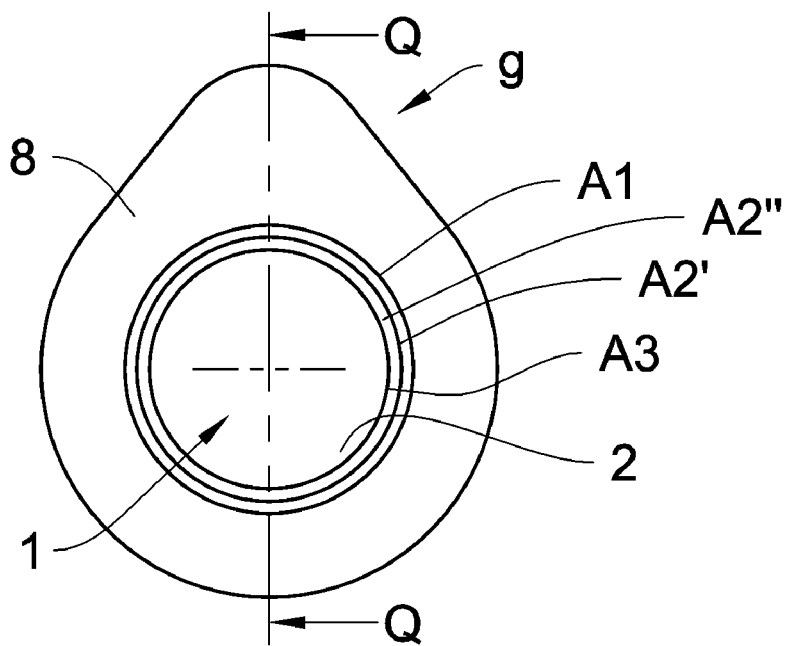
FIG. 1: a view of the pressing-on side of a cam.
Figure 2:
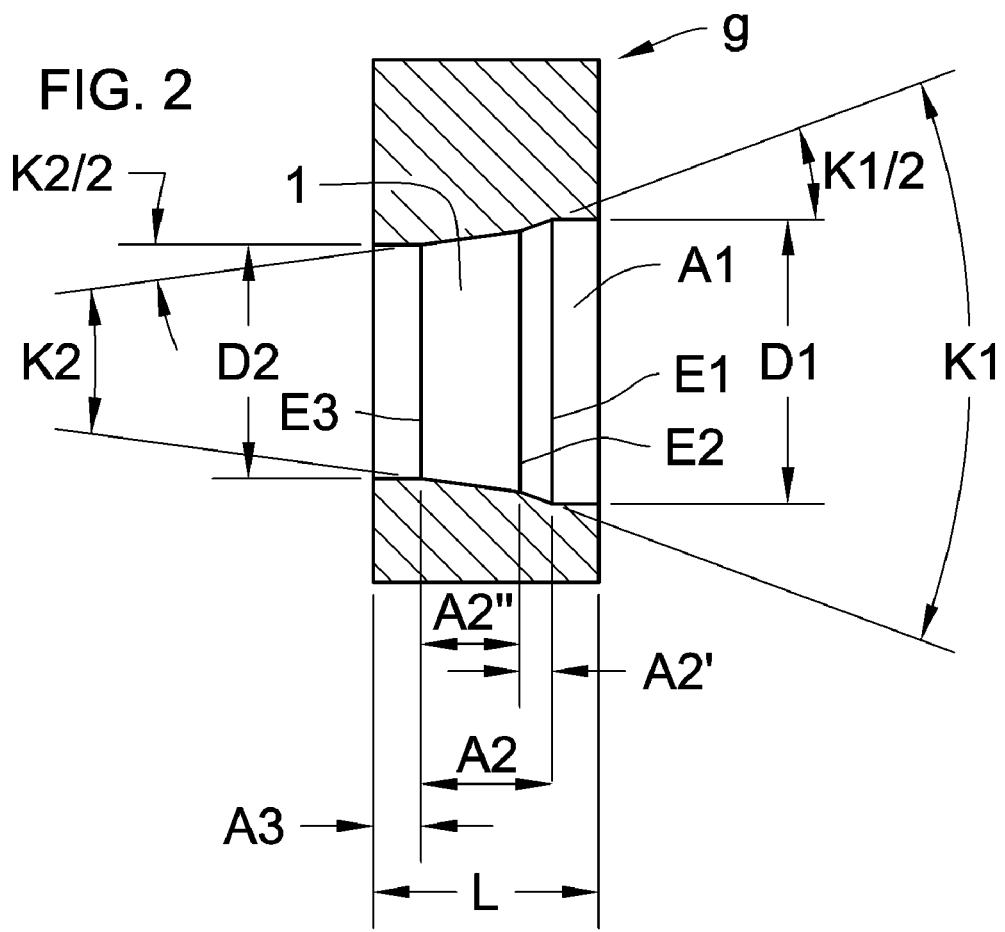
FIG. 2: cross section Q-Q' of the cam of FIG. 1.

According to FIGS. 1 and 2, a cam 9 has a hub 1 with a hub opening 2 in the front surface 8. The cylindrical section A1 with the diameter D1 is closed off by the edge E1 (not recognizable in the figure). The first subsection A2' of the second section (insertion area A2) connects thereto. The surface of this subsection A2' corresponds to a truncated cone with the conical angle K1. This is recognizable in FIG. 2, which shows a section along Q-Q' of FIG. 1. The following subsection A2" likewise is formed to be a truncated cone, but has a smaller conical angle K2, which is smaller than K1. Section A3 of the hub opening 2 has a cylindrical shape with the diameter D2.

Likewise, the transition edges E1, E2, and E3 can be recognized, which clarify the subdivision of the nub 1 into the individual sections A1, A2', A2", and A3.

Figure 3:
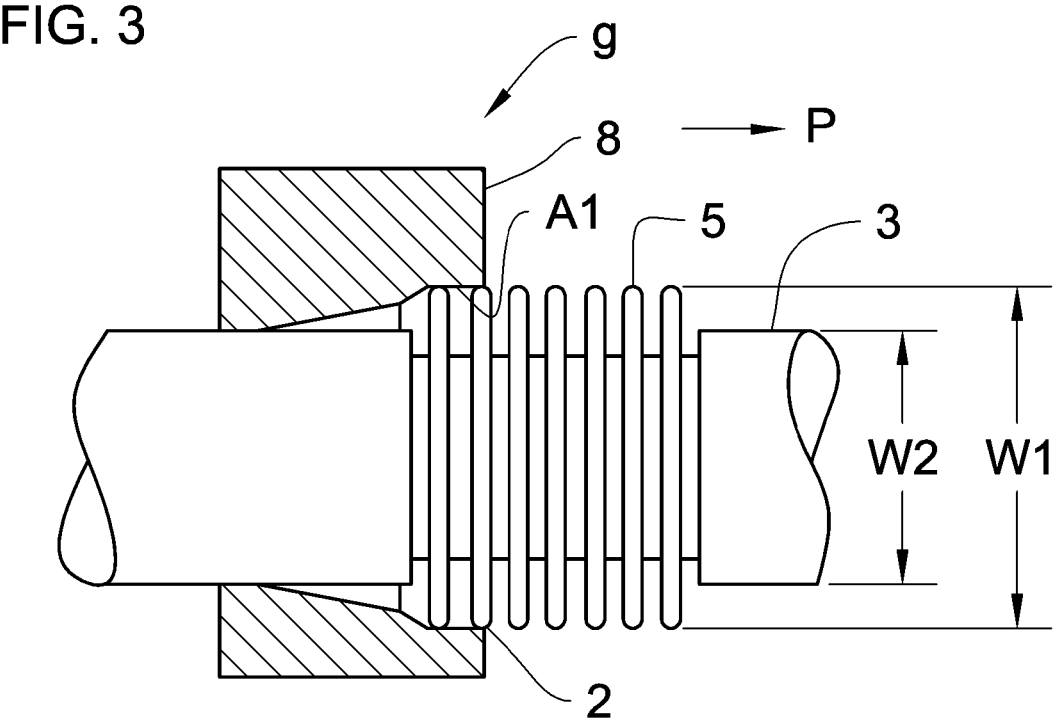
Figure 4:
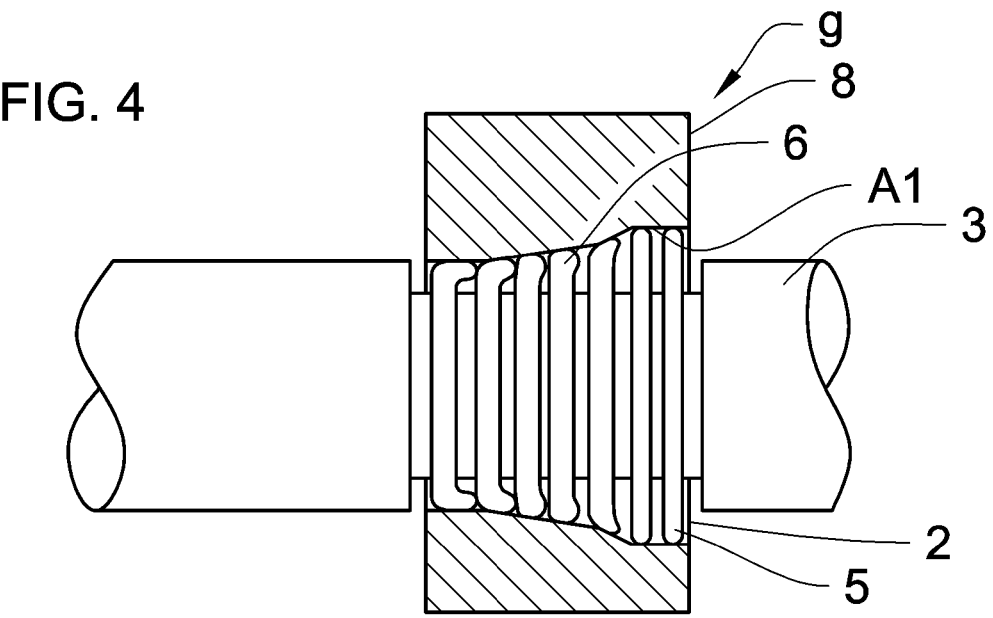

Both FIGS. 3 and 4 show a base body 3 formed as a shaft with corresponding material aggregates 5. The arrow P, therefore, shows the pressing-on direction of the hub opening 2. In FIG. 3, the cam 9 is displaced or pressed onto the based body 3 to such a point that the material aggregates 5 are located in section A1 of the hub opening.

It can be recognized clearly that still no material deformation has occurred. This is visible in FIG. 4, which shows the cam 9 after pressing on. The material aggregates 5 lying behind in the pressing on direction are located already in subsection A2" of the hub opening 2 and have already been substantially deformed (material deformation 6). The section A3 takes up the shaft ridges in section A2, without deformation of this additionally in section A3. The base body 3 has a diameter W2 in the unmachined region and in the region of the material aggregates 5, has a diameter W1.

Figure 5:
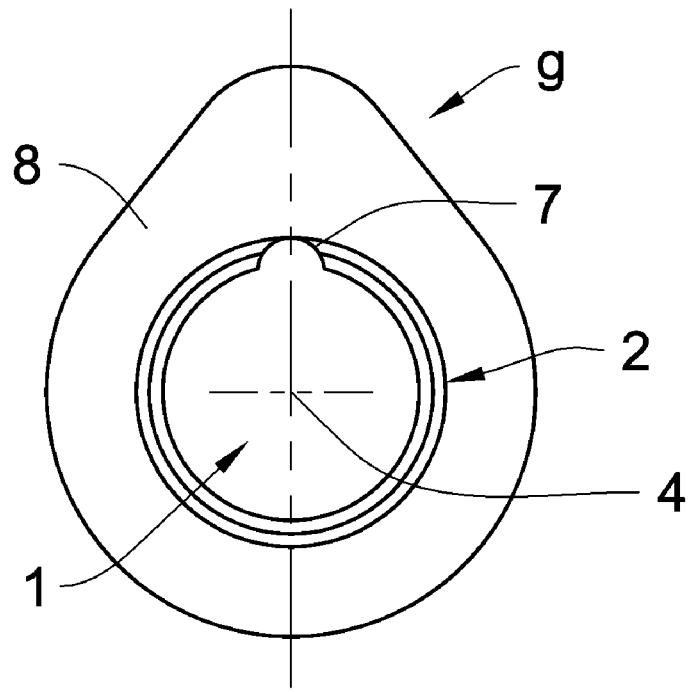
FIG. 5: further embodiment of the cam with an axial running recess.
Figure 6:
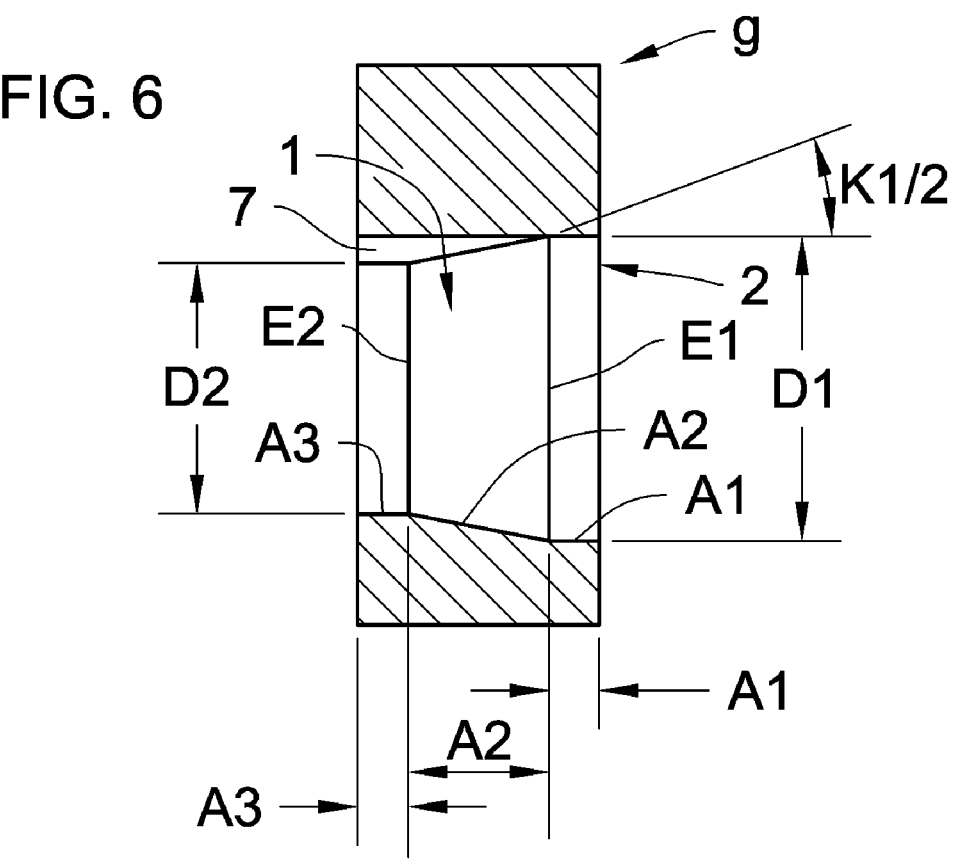
FIG. 6: further embodiment of the insertion section A2 with an axially running recess.

A recess 7 in the hub opening 2 of the hub 1 of the cam 9 is shown in FIG. 5. In the view of the front face 8, it can be seen how the recess 7 extends only into a part of the radial circumference of the hub 1. The radially most outward point of the recess 7 from the longitudinal axis 4 coincides with the surface of section A1. Therefore, the recess 7 can be designated as a narrow channel, since it extends over the length A2 and A3. This recess 7 affects no material deformation upon pressing-on of the cam 9 onto a base body 3. Therefore, the cam 9 performs a circumferential-side fixing onto a base body 3. Also, more than one recess 7 can be located in the hub 1. The profiling of such a recess also can be adapted to the necessary specifications. FIG. 6 shows a further embodiment of the section A2 of the hub 1. This section A2 here is formed by a single cone, which connects sections A1 and A3 by the interior edges E1 and E2. In FIG. 6, the recess 7 is shown in cross section. In addition, also the half conical angle K1 for the section A2 as well as the diameter D1 and D2 of sections A2 or A3 can be recognized.

Figure 7:
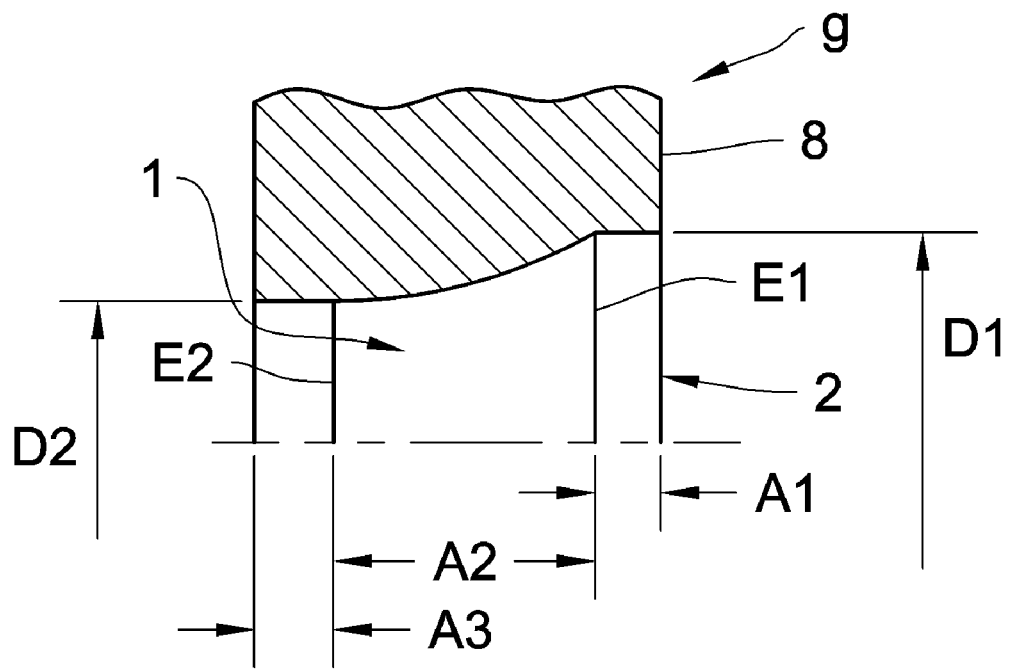
FIG. 7: further embodiment of the insertion section A2.

A further embodiment of the section A2 of the hub 1 according to the present invention is shown in FIG. 7. In addition to the two sections A1 and A3 of the hub opening 2, the cam 9 has a one-part section A2. The profile of the section comprises a continuously changing curve progression. The curve progression can be described as a succession of circular segments, whereby the radius of these circular segments enlarges progressively. The circular segment connecting directly to section A1 has the smallest radius of all of the circular segments, which form the curve progression, that is, the profile of section A2.

Figure 8:
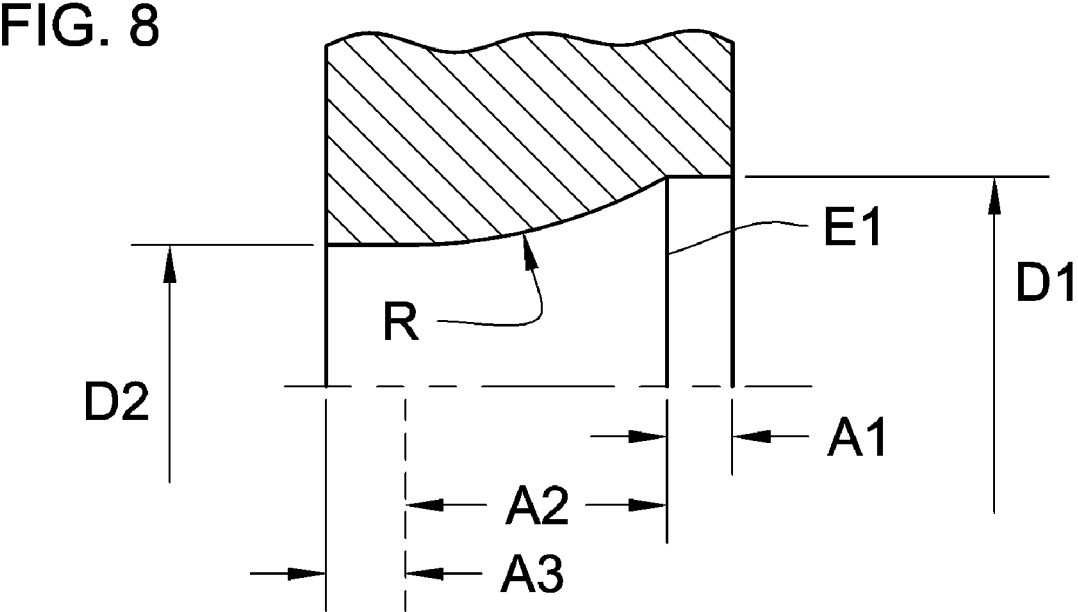
FIG. 8: further embodiment of the insertion section A2.

The largest radius, which opens directly into the section A3, can connect by means of a transition edge E2 discontinuously, as shown in FIG. 7, to section A3. This transition in region A3, however, also can take place continuously, that is, without formation of an edge E2. In this case, the largest radius of the section A2 runs tangentially in the section A3 (analogous to FIG. 8). The curve progression in section A2 also can be formed by a single radius R, which connects discontinuously to section A2 with formation of the edge E1 and opens tangentially, that is, continuously, without edge E2 into the region A3.

Based on the increasingly flattened profile progression in section A2 in the direction of section A3, the connection strains are distributed over a larger area, without causing excessively large load maximums. The connection strains, however, are simultaneously displaced into the interior of the cam 9. Thus, structure defects, such as microscopic tears in the outer regions A1 and A3 of the hub opening 2, are avoided.

The functionality, in particular, the long-term stability, is therefore improved: in addition, it is conceivable that the curve profile is divided into two or more subsections with respective individual curve profiles, such as that described for the embodiment with truncated cone-shaped sections.

An embodiment of the cam 9 of the present invention is based on a cam body made of ball bearing steel with a cam width of 15 mm. The length of the individual sections A1 and A3 as well as the insertion section A2 of the hub opening 2 amounts to 1 mm, 1 mm as well as 13 mm. The diameter D1 of the section A1 amounts to 25.6 mm, whereas the diameter D2 of section A3 amounts to 25.0 mm. The insertion section A2 is subdivided into the subsections A2' and A2" with, respectively, lengths of 2 mm and 11 mm. The subsection A2' has a conical angle of 30°, and the subsection A2" has a conical angle of 15°. The rotating surface of the cam 9 as well as the surface of the hub 1 is hardened, in order to reduce the operating loads and to increase longevity.

With the making of a camshaft, on the corresponding points of the shaft (base body 3), a material aggregate 5 is produced by machining, whose length corresponds approximately to the cam width, that is, 15 mm and its diameter difference W1 minus W2 amounts to approximately 0.6 mm. A cam 9 according to the present invention is placed on the shaft 3 and pressed with a pressing force of approximately 20,000 Newton over this material aggregate.

In this manner, the correct pressing-on must be attended to, in particular, in view of the positioning of the hub center, that is, of the insertion section A2 over this material aggregate. After completion of pressing on of the first cam 9, the further cams 9 are successively pressed on with the correspondingly predetermined distance onto the respectively, individually produced material aggregates 5.

The invention claimed is:

1. A press-fitted hub system comprising:
    a base body formed as a shaft and having at least one region of material aggregate adapted to have a diameter larger than the diameter of the shaft; and
    at least one hub having a hub opening in a front face for pressing onto the base body, whereby the hub opening has an insertion area tapering in a press-on direction, a first cylindrical section arranged as viewed between the front face and insertion area, and a second cylindrical section arranged on the opposite side of the insertion area with reference to the first cylindrical section;
    wherein the length of the first cylindrical section is about 2% to 30% of the entire length of the hub;
    wherein the diameter of the first cylindrical section of the hub opening is at least the same size as the largest diameter of the base body, on which the hub is to be pressed;
    wherein the insertion area is tapered in a press-on direction, and the diameter of the first cylindrical section greater than the diameter of the second cylindrical section.

2. The press-fitted hub system according to claim 1, wherein the material aggregate being adapted to deform when the insertion area and the second cylindrical section is pressed thereon, thereby producing a friction connection between the hub and the base body.

3. The press-fitted hub system according to claim 2, wherein the material aggregate is in the form selected from the group consisting of coils and bars, and wherein the material aggregate can extend either in the circumferential direction of the base body or parallel to the longitudinal axis of the hub.

4. The press-fitted hub system according to claim 1, characterized in that the tapered insertion area has a curve profile, whereby the curve profile is formed from circular segments with different radii placed on one another, and whereby the radii of the circular segments are smaller toward the first cylindrical section.

5. The press-fitted hub system according to claim 1, characterized in that the insertion region has a curve profile, whereby the curve profile is formed by an arch, which discontinuously connects to the first cylindrical section and opens discontinuously or continuously into the second cylindrical section.

6. The press-fitted hub system according to claim 1, characterized in that the insertion area is formed by a truncated cone, which connects the first cylindrical and second cylindrical sections by means of transition edges.

7. The press-fitted hub system according to claim 1, characterized in that the insertion area is divided into two subsections and both subsections of the insertion area are formed in the shape of a truncated cone along the longitudinal axis each having a cone angle different from the other, and that the cone angle of a first subsection arranged toward the first cylindrical section is greater than the cone angle of a second subsection arranged toward the second cylindrical section.

8. The press-fitted hub system according to claim 7, characterized in that the diameter of the second cylindrical section is at least the same size as the diameter of the base body.

9. The press-fitted hub system according to claim 8, characterized in that the length of the second cylindrical section is about 2% to 30% of the entire length of the hub.

10. The press-fitted hub system according to claim 9, characterized in that the length of the insertion area includes 40% to 96% of the entire length of the hub.

11. The press-fitted hub system according to claim 10, characterized in that the ratio of length of the first subsection to the second subsection lies between 0.1 and 10.

12. The press-fitted hub system according to claim 11, characterized in that the first conical angle is about 16° to 30°.

13. The press-fitted hub system according to claim 12, characterized in that the second conical angle is about 1° to 15°.

14. The press-fitted hub system according to claim 13 further comprising at least one cam.

15. The press-fitted hub system according to claim 14 further comprising a camshaft including the cam and hub, wherein the base body is a shaft on which the cam is pressed thereon.

16. A press-fitted hub system comprising:
    a base body formed as a shaft and having at least one region of material aggregate adapted to have a diameter larger than the diameter of shaft;
    a camshaft having at least one cam, wherein the cam having a hub opening for receiving the base body, wherein the hub opening has an insertion area tapered in the press-on direction, characterized in that, viewed in the press-on direction, a first cylindrical section is arranged between the front face and the insertion region;
    wherein the length of the first cylindrical section is about 2% to 30% of the entire length of the hub;
    wherein the hub further comprising a second cylindrical section, the second cylindrical section with reference to the first cylindrical section is arranged on the opposite side of the insertion area, and
    wherein the material aggregate being adapted to deform when the insertion area and the second cylindrical section is pressed thereon;
    wherein the insertion area is tapered in a press-on direction, and the diameter of the first cylindrical section greater than the diameter of the second cylindrical section.

* * * * *